United States Patent
Hong et al.

(10) Patent No.: US 7,926,154 B2
(45) Date of Patent: Apr. 19, 2011

(54) METHOD OF MANUFACTURING MULTI-LAYER CERAMIC CONDENSER

(75) Inventors: Ki Pyo Hong, Gyunggi-do (KR); Byeung Gyu Chang, Gyunggi-do (KR); Ji Hwan Shin, Gyunggi-do (KR); Gyu Man Hwang, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 327 days.

(21) Appl. No.: 12/271,428

(22) Filed: Nov. 14, 2008

(65) Prior Publication Data
US 2009/0126174 A1    May 21, 2009

(30) Foreign Application Priority Data
Nov. 16, 2007   (KR) .................. 10-2007-0117236

(51) Int. Cl.
*H01G 7/00*    (2006.01)
(52) U.S. Cl. ............. 29/25.42; 29/25.03; 29/25.41; 29/852; 29/854
(58) Field of Classification Search ........... 29/829–833, 29/852, 846, 592.2, 25.01–25.03, 25.35–25.42; 174/255, 260–264; 361/305, 311, 321.2, 361/301.1, 303
See application file for complete search history.

(56) References Cited

U.S. PATENT DOCUMENTS

| | | | |
|---|---|---|---|
| 5,153,987 A * | 10/1992 | Takahashi et al. | 29/852 |
| 5,599,413 A | 2/1997 | Nakao et al. | |
| 5,625,935 A * | 5/1997 | Kubota et al. | 29/25.42 |
| 6,333,857 B1 * | 12/2001 | Kanbe et al. | 361/792 |
| 6,351,880 B1 * | 3/2002 | Palmer et al. | 29/25.42 |
| 7,290,315 B2 * | 11/2007 | Palanduz et al. | 29/25.41 |
| 7,676,921 B2 * | 3/2010 | Kim et al. | 29/832 |
| 7,703,198 B2 * | 4/2010 | Jeong et al. | 29/832 |
| 2004/0231885 A1 * | 11/2004 | Borland et al. | 174/260 |

FOREIGN PATENT DOCUMENTS

| | | |
|---|---|---|
| JP | 11-251179 | 9/1999 |
| JP | 2002-083515 | 3/2002 |
| KR | 0127666 | 12/1997 |
| KR | 10-2005-0029927 A | 3/2005 |

OTHER PUBLICATIONS

Korean Office Action issued in Korean Patent Application No. KR 10-2007-0117236, dated Mar. 6, 2009.
Japanese Office Action, w/ English translation thereof, issued in Japanese Patent Application No. JP 2008-292677 dated Feb. 8, 2011.

* cited by examiner

*Primary Examiner* — Minh Trinh
(74) *Attorney, Agent, or Firm* — McDermott Will & Emery LLP

(57) ABSTRACT

There is provided a method of manufacturing a multi-layer ceramic condenser. A method of manufacturing a multi-layer ceramic condenser may include: laminating a plurality of dielectric green sheets having internal electrodes formed thereon to form a laminate; forming through holes in a region of the laminate where an external electrode is to be formed; filling the through holes with conductive paste to form the external electrode; cutting the laminate having the external electrode formed thereon; and firing the cut laminate to form at least one multi-layer ceramic condenser.

5 Claims, 3 Drawing Sheets

… (1) …

METHOD OF MANUFACTURING MULTI-LAYER CERAMIC CONDENSER

CROSS-REFERENCE TO RELATED APPLICATIONS

This application claims the priority of Korean Patent Application No. 2007-0117236 filed on Nov. 16, 2007, in the Korean Intellectual Property Office, the disclosure of which is incorporated herein by reference.

BACKGROUND OF THE INVENTION

1. Field of the Invention

The present invention relates to methods of manufacturing a multi-layer ceramic condenser, and more particularly, to a method of manufacturing a multi-layer ceramic condenser that forms an external electrode by forming through holes in a laminate of a plurality of ceramic dielectric sheets and filling the through holes with conductive paste.

2. Description of the Related Art

In general, condensers are passive components that apply a voltage and accumulate electric charges according to an electrode area with respect to a thickness of a dielectric material. Among these condensers, a so-called multi-layer ceramic condenser is a chip type condenser that includes multiple layers of dielectric sheets and electrodes as small thin films according to the use of the capacitance and the rated voltage. Since a surface mount technology can be used for the multi-layer ceramic condenser, the condenser can have high efficiency and high reliability. Further, since the chip type condenser has a small internal inductance, it can also be used in a high frequency band. The chip type condenser is widely used for a by-pass filter and an electronic device having, for example, an integro-differential circuit.

FIGS. 1A and 1B are vertical cross-sectional views illustrating a method of manufacturing a multi-layer ceramic condenser according to the related art. Referring to FIG. 1A, ceramic dielectric sheets 1a, 1b, 1c, and 1d are laminated to form a laminate 1. Specifically, glass-ceramic powder, a dielectric material, an organic binder, a dispersing agent, and a mixed solvent are mixed with each other to form slurry. The slurry is coated using a doctor blade method, and then dried, thereby manufacturing one ceramic dielectric sheet. By using this method, the plurality of ceramic dielectric sheets 1a, 1b, 1c, and 1d are manufactured, and then laminated. Here, before the ceramic dielectric sheets 1a, 1b, 1c, and 1d are laminated, conductive paste is applied to each of the ceramic dielectric sheets by screen printing to form internal electrodes 2 inside the laminate 1.

Then, a firing process is performed at a firing temperature of the laminate 1. Here, the firing temperature of the laminate 1 may be in the range of approximately 600 to 1000° C. The laminate 1 is sintered and shrunk during the firing process.

Then, the laminate 1 is cut along the line a-a' and the line b-b' so that the internal electrodes 12 are exposed to the outside. Conductive paste is applied to both side surfaces of the laminate 1 by using a dipping method or a wheel transfer method. The laminate 1 applied with the conductive paste is then re-heated, and dried to form external electrodes 3. As a result, a multi-layer ceramic condenser 10, shown in FIG. 1B, can be manufactured.

In the related art, according to the method of manufacturing the multi-layer ceramic condenser 10, the external electrodes 3 are formed after the laminate 1 is completely sintered during the firing process, which causes poor adhesion between the laminate 1 and the external electrodes 3. In general, the adhesion between the laminate 1 and the external electrodes 3 may be determined by the amount of glass components remaining in the laminate 1. However, since the glass components included in the laminate 1 are crystallized during the firing process, the amount of the glass components remaining in the laminate 1 is significantly reduced. Therefore, even though the re-heating process is performed after the conductive paste is applied to the laminate 1, the adhesion between the laminate 1 and the external electrodes 3 may be significantly reduced. Further, the re-heating process causes an increase in processing time and processing cost, thereby increasing an increase in product cost.

SUMMARY OF THE INVENTION

An aspect of the present invention provides a method of manufacturing a multi-layer ceramic condenser that increases adhesion between a laminate and an external electrode by forming through holes in the laminate including a circuit pattern and filling the through holes with conductive paste to form the external electrode.

According to an aspect of the present invention, there is provided a method of manufacturing a multi-layer ceramic condenser, the method including: laminating a plurality of dielectric green sheets having internal electrodes formed thereon to form a laminate; forming through holes in a region of the laminate where an external electrode is to be formed; filling the through holes with conductive paste to form the external electrode; cutting the laminate having the external electrode formed thereon; and firing the cut laminate to form at least one multi-layer ceramic condenser.

The forming the through holes may include punching the region of the laminate where the external electrode is to be formed.

The each of the through holes may be formed in any one of a rectangular shape and a circular shape.

The filling the through holes with the conductive paste to form the external electrode may be performed using a screen printing method.

The region where the external electrode is to be formed may be a region adjoining the internal electrodes from regions where the internal electrodes are not formed.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1A:
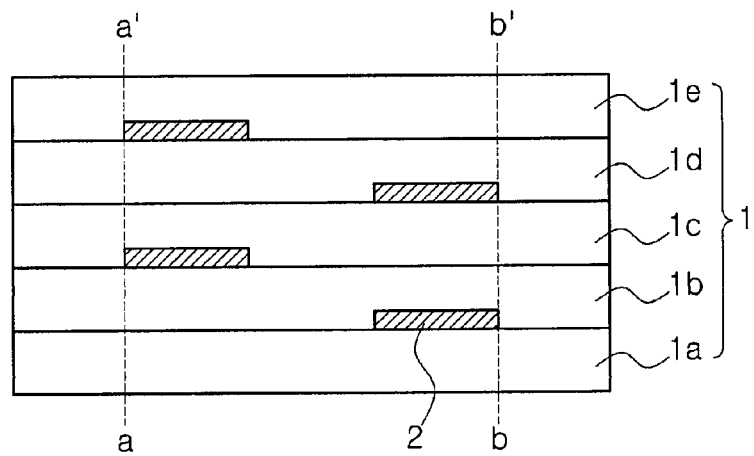
FIGS. 1A and 1B are vertical cross-sectional views illustrating a method of manufacturing a multi-layer ceramic condenser according to the related art.
Figure 1B:
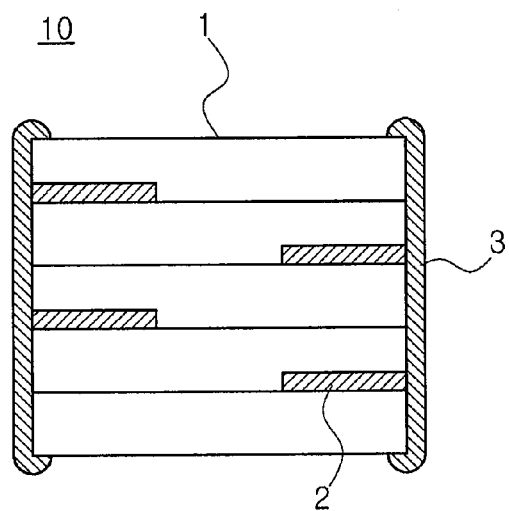
Figure 2A:
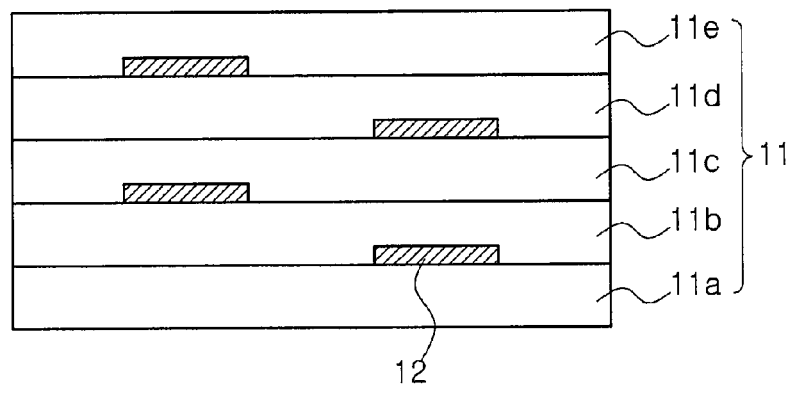
FIGS. 2A through 2E are vertical cross-sectional views illustrating a method of manufacturing a multi-layer ceramic condenser according to an exemplary embodiment of the invention.

FIGS. 2A through 2E are vertical cross-sectional views illustrating a method of manufacturing a multi-layer ceramic condenser according to an exemplary embodiment of the invention. Referring to FIG. 2A, a plurality of ceramic dielectric sheets 11a, 11b, 11c, and 11d are laminated to form a laminate 11. Specifically, glass-ceramic powder and a dielectric material are mixed with an organic binder, a dispersing agent, and a mixed solvent to form slurry. Here, the dielectric material may be formed of $BaTiO_3$. The slurry is applied with a predetermined thickness by using a doctor blade method, and then dried to form one ceramic dielectric sheet.

Internal electrodes 12 are formed by applying conductive paste to the ceramic dielectric sheets. Here, the conductive paste may be formed of a metal, such as Pd, Ni, or Ag, or a metal mixture.

Figure 2B:
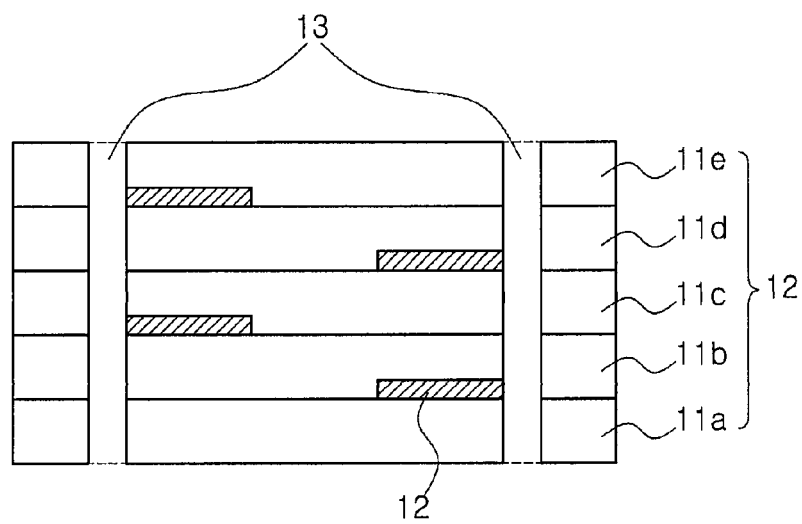

Then, as shown in FIG. 2B, a region of the laminate 11, where external electrodes are to be formed, is punched to form through holes 13. Here, the region where the external electrodes are to be formed may be a region adjoining the internal electrodes 12 from regions of the laminate 11 where the internal electrodes 12 are not formed. That is, the region where the external electrodes are to be formed may border the internal electrodes 12.

Figure 2C:
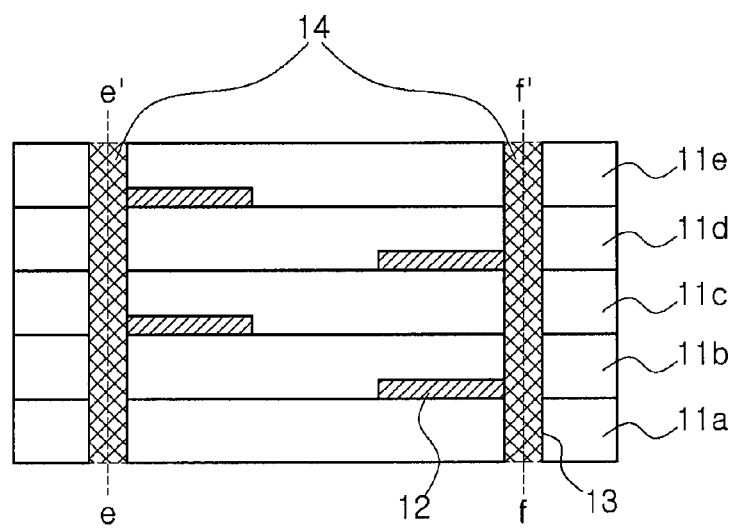

Referring to FIG. 2C, a conductive paste fills the through holes 13 formed in the laminate 11 by using a screen printing method so as to form external electrodes 14. The laminate 11, shown in FIG. 2C, is cut along the dotted line e-e' and the dotted line f-f'.

During this process, the external electrodes 14 may be formed of the conductive paste that includes a metal, such as Pd, Ni, or Ag, or a metal mixture.

Figure 2D:
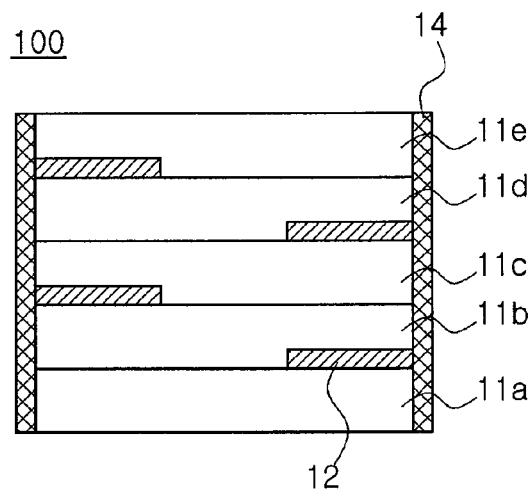

As shown in FIG. 2D, the laminate 11 is sintered at a corresponding firing temperature, that is, at a temperature within the range of approximately 600 to 1000° C. During the firing process, as glass components contained in the laminate 11 are crystallized, the adhesion between the laminate 11 and the external electrodes 14 in the through holes 13 can be increased. As a result, a multi-layer ceramic condenser having the external electrodes 14 formed on both side surfaces of the laminate 11 can be manufactured.

Figure 2E:
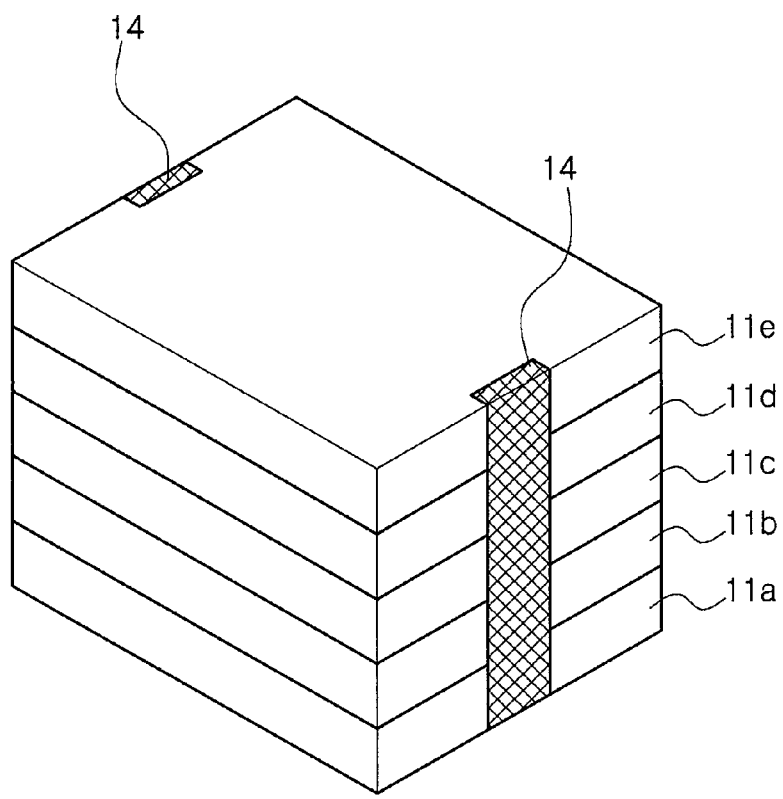

FIG. 2E is a schematic view illustrating the multi-layer ceramic condenser 100 illustrated in FIG. 2D. The external electrodes 14 do not protrude from the outside of the laminate 11 but are included in the laminate 11. Therefore, the multi-layer ceramic condenser 100 can be formed into a rectangular parallelepiped. Further, the internal electrodes 2 are mounted in the multi-layer ceramic condenser 100, and connected to the external electrode 14.

Figure 3:
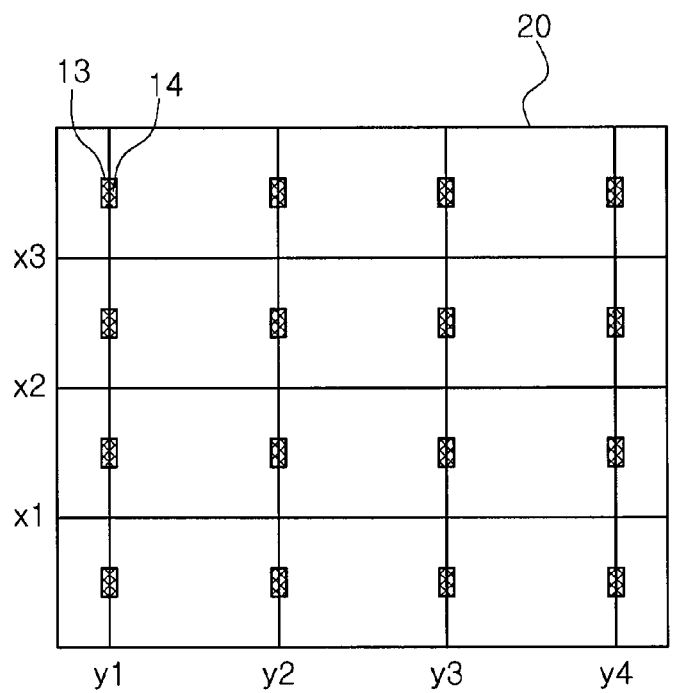
FIG. 3 is a plan view illustrating a laminate having external electrodes formed thereon.

FIG. 3 is a plan view illustrating a laminate having external electrodes formed thereon. In FIGS. 2A through 2E, only one laminate is illustrated for the convenience of explanation. However, in a case of a general laminate, a plurality of multi-layer ceramic condensers may be manufactured. That is, as shown in FIG. 3, a laminate 20 includes a plurality of through holes 13 and a plurality of external electrodes 14. Here, when the laminate 20 is cut along lines indicated by x1, x2, x3 and lines indicated by y1, y2, y3, and y4, a plurality of multi-layer ceramic condensers can be manufactured in chip unit.

After the external electrodes 14 are formed within the laminate 20 by using the above-described method, a firing process is performed such that the adhesion between the laminate 20 and the external electrode 14 can be increased. Further, since an additional re-heating process is not required to form the external electrodes 14, a multi-layer ceramic condenser can be more efficiently manufactured in terms of processes.

As set forth above, according to exemplary embodiments of the invention, through holes are formed in a laminate including internal electrodes, the through holes are filled with conductive paste to form external electrodes, and then a laminate is sintered. Accordingly, adhesion the between the laminate including the internal electrodes and the external electrodes is increased, and a re-heating process of forming the external electrodes is not required, which causes a reduction in processing time and processing cost.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing a multi-layer ceramic condenser, the method comprising:
   laminating a plurality of dielectric green sheets having internal electrodes formed thereon to form a laminate;
   forming through holes in a region of the laminate where an external electrode is to be formed;
   filling the through holes with conductive paste to form the external electrode;
   cutting the laminate having the external electrode formed thereon; and
   firing the cut laminate to form at least one multi-layer ceramic condenser.

2. The method of claim 1, wherein the forming the through holes comprises punching the region of the laminate where the external electrode is to be formed.

3. The method of claim 1, wherein each of the through holes may be formed in any one of a rectangular shape and a circular shape.

4. The method of claim 1, wherein the filling the through holes with the conductive paste to form the external electrode is performed using a screen printing method.

5. The method of claim 1, wherein the region where the external electrode is to be formed is a region adjoining the internal electrodes from regions where the internal electrodes are not formed.

* * * * *